No. 607,818. Patented July 26, 1898.
W. G. ASHBURNER.
DISINFECTING APPARATUS FOR WATER CLOSETS, &c.
(Application filed Jan. 15, 1897.)
(No Model.)

WITNESSES

INVENTOR
William G. Ashburner
BY
Edgar Tate & Co
ATTORNEYS.

UNITED STATES PATENT OFFICE.

WILLIAM GEORGE ASHBURNER, OF DALTON-IN-FURNESS, ENGLAND.

DISINFECTING APPARATUS FOR WATER-CLOSETS, &c.

SPECIFICATION forming part of Letters Patent No. 607,818, dated July 26, 1898.

Application filed January 15, 1897. Serial No. 619,290. (No model.)

*To all whom it may concern:*

Be it known that I, WILLIAM GEORGE ASHBURNER, a citizen of the United Kingdom of Great Britain and Ireland, residing at Elliscales House, Dalton-in-Furness, in the county of Lancaster, England, have invented certain new and useful Improvements in Disinfecting Apparatus for Water-Closets and the Like, of which the following is a full and complete specification, such as will enable those skilled in the art to which it appertains to make and use the same.

This invention relates to disinfecting apparatus for use in water-closets and other and similar places; and the object thereof is to provide an improved device of this class which is simple in construction and operation and which is adapted for use whenever such devices are necessary.

The invention is fully disclosed in the following specification, of which the accompanying drawings form a part, in which—

Figure 1:
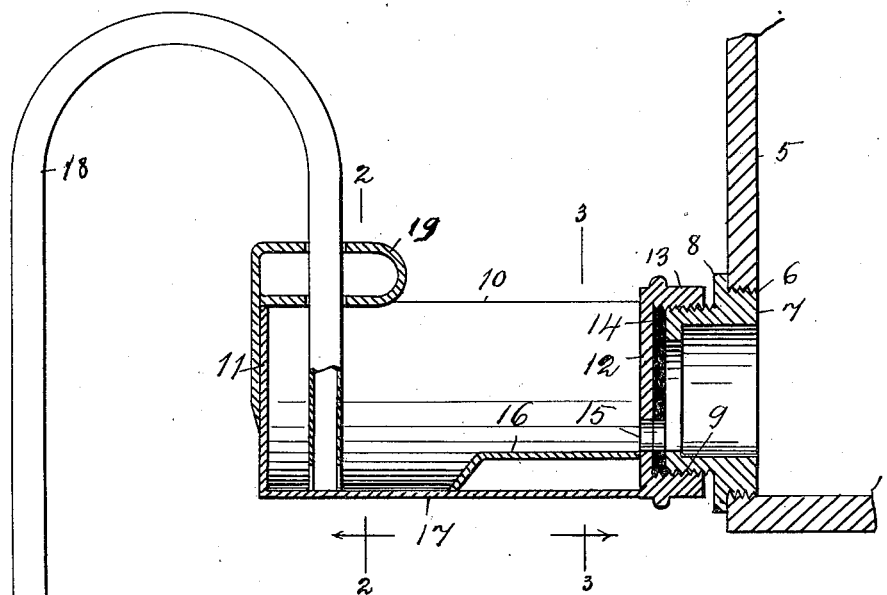
Figure 2:
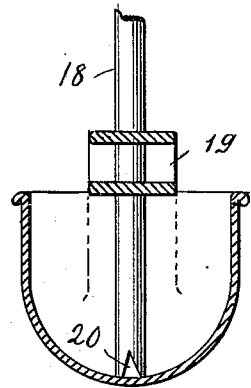
Figure 3:
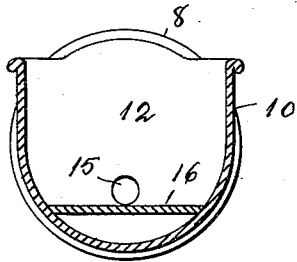

Figure 1 is a sectional side view of the operative parts thereof, showing the method of connecting the disinfecting apparatus with a vessel in which the disinfecting material is placed, only a part of said tank being shown; Fig. 2, a section on the line 2 2 of Fig. 1; and Fig. 3, a section on the line 3 3 of Fig. 1, the vessel with which the operative parts of the apparatus are connected being omitted.

In the drawings forming part of this specification the separate parts of my improvement are designated by the same numerals of reference in each of the views, and in the practice of my invention I provide an airtight tank 5, only part of which is shown, in which the disinfecting material is placed, and said tank may be of any desired shape and composed of any preferred material and be of any desired capacity.

The vessel 5 is provided at one side thereof and at its bottom with a screw-threaded opening which is provided with a tubular plug 7, which is also screw-threaded and provided with an annular flange 8 and a screw-threaded extension 9, and I also provide a receptacle 10, which is open at the top and oblong in form and one end of which is closed, as shown at 11, and the other end of which is provided with a cap or head 12, on which is formed an outwardly-directed rim or flange 13, which is screw-threaded and adapted to be connected with the screw-threaded extension 9 of the plug 7, and between the screw-threaded extension 9 of the tubular plug 7 and the cap or head 12 of the receptacle 10 is a packing-ring 14 of any suitable material.

The cap or head 12 of the well 10 is provided near the bottom thereof with a small port or opening 15, the bottom of which is on a line with the bottom of the opening in the screw-threaded extension 9 of the tubular plug 7, and the end of the receptacle 10 adjacent to the cap or head 12 is raised or provided with a longitudinal partition 16, which projects along the bottom of the receptacle about one-half of its length, whereby a well 17 is formed at the outer end of the receptacle, and I also provide a siphon-tube 18, one end of which passes through a yoke or loop 19, which is secured to the outer end of the receptacle, and said end of the siphon-tube extends downwardly to the bottom of the well 17, as shown in Figs. 1 and 2, and is provided at the lower end thereof with notches or recesses 20.

The vessel 5 can be placed either on the top or adjacent to any ordinary flush-tank, so long as the bottom of the vessel is higher than the water-level in the flush-tank when the latter is full.

The flush-tank is not shown in the drawings for the reason that it forms no part of this invention, and the vessel 5 is filled through the opening 6, after which the plug 7, with which the cap or head 14 of the well is connected, is inserted, and the contents of said vessel escape through the small port or passage 15 and flow over the raised portion or partition 16 at the bottom of the receptacle into the well 17, and the sides of the receptacle are extended upwardly, as hereinbefore described, to about a level with the upper portion of the hole or opening 6 in the vessel 5.

The well 17 may be made of any desired capacity, but is usually preferably made quite small, and when the fluid in the receptacle reaches the level of the top of the opening 15 the tank 5 is sealed, and the disinfectant ceases to flow until said receptacle is empty, which emptying is effected by the siphon-pipe 18, by which the disinfectant is conveyed into the flush-tank of the water-closet.

The outer end or arm of the siphon-pipe 18 extends in practice into the water in the flush-tank of the water-closet, which is not shown, and when the water is exhausted from the flush-tank a vacuum will be created in the siphon and the disinfectant in the receptacle 10 will be emptied and the receptacle 10 will be again filled from the tank 5. In this operation the liquid will flow in the siphon until the well 17 is completely emptied, and as it flows under a stronger head than the disinfectant through the opening 15 the well 17 will be quickly emptied and the flow in the siphon will cease, and the partition 16 aids in this operation, as the disinfectant from the opening 15 flows over the partition and into the well 17, thereby removing a portion of the inflowing disinfectant from the action of the siphon while the siphon is emptying the well 17.

This device is simple in construction and operation and is perfectly adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

In a disinfecting apparatus, an air-tight tank having a screw-threaded opening therein, a receptacle 10, open at the top and provided with a longitudinal partition adjacent to the bottom of said receptacle and a well at the opposite end, a cap 12 having an opening therein, the lower edge of which is on the same horizontal plane as said partition, a screw-threaded flange thereon, a plug 7 provided with screw-threaded projections whereby said receptacle is connected with said tank, a yoke firmly attached to said receptacle and a siphon supported by said yoke, the short arm of which projects into said well into close juxtaposition to the bottom thereof, and the long arm of which communicates with a flush-tank, the action of which creates a vacuum to cause said siphon to act, substantially as described.

In testimony that I claim the foregoing as my invention I have signed my name, in presence of the subscribing witnesses, this 24th day of December, 1896.

WILLIAM GEORGE ASHBURNER.

Witnesses:
WILLIAM ELLERAY GELDERD,
WILLIAM TAYLOR.